United States Patent [19]

Marans et al.

[11] 4,008,294

[45] Feb. 15, 1977

[54] THICKENED POLYESTER COMPOSITION CONTAINING ULTRAFINE POLYPROPYLENE FIBERS

[75] Inventors: Nelson S. Marans, Silver Spring; Thomas E. Ferington, Columbia, both of Md.; Philip Messina, Colonia, N.J.

[73] Assignee: W. R. Grace & Co., New York, N.Y.

[22] Filed: July 22, 1975

[21] Appl. No.: 598,099

Related U.S. Application Data

[62] Division of Ser. No. 527,514, Nov. 27, 1974, abandoned.

[52] U.S. Cl. .............................................. 260/862
[51] Int. Cl.[2] .......................................... C08K 7/02
[58] Field of Search ..................................... 260/862

[56] References Cited

UNITED STATES PATENTS

| 3,227,665 | 1/1966 | Fourcade | 260/2.5 |
|---|---|---|---|
| 3,283,036 | 11/1966 | Larson | 260/897 |
| 3,354,114 | 11/1967 | Doyle | 260/862 |
| 3,397,169 | 8/1968 | Wilkinson | 260/862 |
| 3,615,995 | 10/1971 | Buntin | 156/161 |
| 3,701,748 | 10/1972 | Kroekel | 260/862 |

*Primary Examiner*—Paul R. Michl
*Attorney, Agent, or Firm*—Elton Fisher

[57] ABSTRACT

Ultra fine polypropylene fibers having a length of 1–100 microns and a diameter of 0.05–2 microns are admixed with a polyester resin composition comprising a polyester resin of a polyhydric alcohol and an unsaturated polycarboxylic acid admixed with a solvent such as styrene in an amount effective to cause the resulting thickened composition to have a thixotropic index of 1.5–8. The resulting thickened composition is useful for building or repairing fiber glass-polyester boats. The incorporation of such ultrafine polypropylene fibers in an epoxy resin composition also thickens the epoxy resin composition and causes it to have a thixotropic index of about 1.5–8.

2 Claims, No Drawings

4,008,294

THICKENED POLYESTER COMPOSITION CONTAINING ULTRAFINE POLYPROPYLENE FIBERS

This is a division of application Ser. No. 527,514 filed Nov. 27, 1974, now abandoned.

BACKGROUND OF THE INVENTION

This invention is in the field of curable epoxy and polyester resin compositions. More particularly, it is in the field of curable thixotropic epoxy and polyester resin compositions which are useful for building or repairing fiber glass-polyester or epoxy boats and for repairing fiber glass-polyester or epoxy vehicle bodies.

A thixotropic polyester resin composition can be prepared by admixing ultrafine polypropylene fibers having a length of about 1–100 microns and a diameter of about 0.05–2 microns with a polyester resin composition comprising a polyester resin of a polyhydroxy alcohol (including a dihydroxy alcohol) and an unsaturated polycarboxylic acid (including an unsaturated dicarboxylic acid).

Ultrafine polymeric fibers (which are also known as ultrafine plastic fibers) are well known to those skilled in the art and methods for preparing such fibers are also well known.

U.S. Pat. No. 3,099,067 (139/420 Merriam et al) teaches that such fibers can be prepared by;

a. extruding a mixture of two or more normally solid mutually incompatible thermoplastic resins to form a composite monofilament having as its minor component the resin material from which the ultrafine fiber is to be formed;

b. dissolving the major resin component of the monofilament in a solvent in which the minor component is insoluble or substantially insoluble; and c. recovering the resulting ultrafine fiber.

U.S. Pat. No. 3,549,734 (264/37 Yasuda et al.) teaches the preparation of ultrafine polypropylene fibers by such technique wherein polystyrene is extruded with polypropylene using the polypropylene as the minor component of the resulting composite fiber. The polystyrene is dissolved in benzene leaving an ultrafine polypropylene fiber which is recovered.

An article by Miller et al (Textile Research Journal, December 1973, pp 728–733) teaches a similar method for preparing ultrafine polypropylene fibers having diameters in the range of 0.05–1 micron. Miller et al use an admixture of polypropylene and an ethylene-acrylic acid copolymer salt to form their ultrafine polypropylene fibers.

The above-mentioned Merriam et al reference also teaches that ultrafine polymeric fibers can be prepared by subjecting a molten polymer to the action of a high velocity jet of gas. A method for using this technique comprises spreading a molten polymer heated to a highly fluid condition on a heated surface to form a film of molten polymer on the surface and subjecting such film to a blast of hot gas or vapor. This causes small globules of the molten polymer to form. The jet of hot gas breaks the small globules into ultrafine fibers. As these fibers are moved by the gas stream cooling occurs and the fibers become rigid and are broken into segments by the stream of gas in which they are suspended. The segments are collected on a screen or other surface in the form of an entangled mat which is recovered.

Another method useful for preparing ultrafine fibers of a thermoplastic polymer comprises extruding the thermoplastic polymer through a die which has its die openings arranged in a circle. The extruded polymer is contacted with a stream of hot gas which attenuates the extruded polymer into ultrafine fibers. U.S. Pat. No. 3,615,995 (156/161, Butin et al) and U.S. Pat. No. 3,595,245 (131/269, Butin et al) teach the use of such technique to produce ultrafine polypropylene fibers. U.S. Pat. No. 3,773,590 (156/244, Morgan) teaches the production of a mat of ultrafine polypropylene fibers.

U.S. Pat. No. 3,293,205 (260/37, Doyle et al) teaches the use of finely divided polyoxymethylene fibers to thicken liquid polyester compositions and U.S. Pat. No. 3,354,114 (260/40, Doyle) teaches the use of finely divided polystyrene fibers to thicken polyester compositions. These patents teach the use of a fluid energy mill to prepare short fibers from long polyoxymethylene and long polystyrene fibers.

SUMMARY OF THE INVENTION

In Summary, this invention is directed to an improvement in (a) a liquid epoxy resin composition or (b) a liquid ethylenically unsaturated polyester resin composition comprising a polyester resin of a polyhydric alcohol and an ethylenically unsaturated polycarboxylic acid admixed with a solvent consisting of styrene, methyl acrylate, ethyl acrylate, methyl methacrylate, ethyl methacrylate, trimethylolpropane triacrylate, trimethylolpropane trimethacrylate, pentaerythritol tetraacrylate, pentaerythritol tetramethacrylate, triallyl cyanurate, diallyl maleate, divinylbenzene, diallyl phthalate, and the like, the improvement comprising the presence in the composition of an amount of ultrafine polypropylene fibers effective for causing the composition to have a thixotropic index of 1.5–8 over a 10 fold change in the rate of spindle rotation, the viscosity being determined with a Brookfield viscometer using a number 4 spindle, the spindle rotating 6 and 60 times per minute respectively, the polypropylene fibers having a length of 1–100 microns and a diameter of about 0.05–2 microns.

DESCRIPTION OF PREFERRED EMBODIMENTS

In preferred embodiments of the invention recited in the above summary:

1. The viscosity of the improved epoxy or polyester resin composition including the polypropylene fibers is 1000–25000 centipoises at 25° C where using a Brookfield viscometer with a number 4 spindle rotating at 6 revolutions per minute.

2. The improved epoxy or polyester resin composition contains 0.1–10% of the ultrafine polypropylene fibers.

3. Where the resin composition is a polyester resin composition the solvent is styrene.

In another embodiment (Embodiment A) this invention is directed to an improvement in (a) a liquid epoxy resin composition or (b) a liquid ethylenically unsaturated polyester resin composition comprising a polyester resin of a polyhydric alcohol and an ethylenically unsaturated poycarboxylic acid admixed with a solvent consisting essentially of styrene, methyl, acrylate, ethyl acrylate, methyl methacrylate, ethyl methacrylate, trimethylolpropane triacrylate, trimethylolpropane trimethacrylate, pentaerythritol tetraacrylate, pentaerythritol tetramethacrylate, triallyl cyanurate, diallyl maleate, divinylbenzene, diallyl phthalate, and the like, the improvement comprising the presence in the composition of an amount of ultrafine polypropylene fibers effective for causing the composition to have a thixotropic index of 1.5-8 over a 10 fold change in the rate of spindle rotation, the viscosity being determined with a Brookfield viscometer using a number 4 spindle, the spindle rotating 6 and 60 times per minute respectively, the polypropylene fibers being short ultrafine polypropylene fibers having a length of about 1-100 microns, and a diameter of about 0.05-2 microns, said short fibers being preparef by agitating a slurry (preferably an aqueous slurry) of ultrafine polypropylene fibers in a high shear rotary blade mixer (e.g., a Waring blender) for a time efffective to reduce the length of the ultrafine polypropylene fibers to about 1-100 microns (i.e., to convert the fibers into short fibers having lengths varying from about 1-100 microns), separating, drying, and recovering the resulting short ultrafine polypropylene fibers.

Styrene is an especially preferred solvent in the polyester resin composition of Embodiment A.

The epoxy or ethylenically unsaturated polyester resin composition of Embodiment A generally contains about 0.1-10% of the short (1-100 microns long) ultrafine polypropylene fibers.

The viscosity of the epoxy or unsaturated polyester resin composition of Emboidment A (the composition containing the short ultrafine polypropylene fibers) is generally about 1,000-25000 centipoises where measured at 25° C with a Brookfield viscometer using a No. 4 spindle rotating at 6 revolutions per minute and about 500-10,000 centipoises where measured with the same apparatus at 25° C with the spindle rotating 60 times per minute — i.e., the thixotropic index is about 1.5-8 over a ten fold change in spindle speed.

DETAILED DESCRIPTION OF THE INVENTION

Epoxy resins are taught by pages 294-312 of Volume 8 of the Kirk-Othmer Encyclopedia of Chemical Technology, Second Edition, 1965. Epoxy resins are also taught by Lee et al "Epoxy Resins, Their Application and Technology", McGraw-Hill Book Company, Inc., New York, N.Y., 1957 and by pages 31-32 of Volume 48, No. 10A of the "Modern Plastics Encyclopedia", 1971-1972.

Curable ethylenically unsaturated polyester resin compositions are well known to those skilled in the art.

Curable unsaturated polyester resin compositions and/or methods for making such compositions are taught by the following U.S. Patents:

| Patent No. | Inventors | Classification |
| --- | --- | --- |
| 3,553,292 | Stahley et al | 260/864 |
| 3,553,293 | Stahley et al | 260/866 |
| 3,555,116 | Stahley et al | 260/864 |
| 3,503,921 | Souza et al | 260/40 |

Said patents are incorporated herein by reference.

Such polyesters and the preparation and properties thereof are also taught by the Kirk-Othmer Encyclopedia of Chemical Technology, Volume 16, Second Edition (1968) pp. 159-189.

Ethylenically unsaturated polyester resin compositions which are excellently adapted for use when preparing the thixotropic curable ethylenically unsaturated polyester composition of this invention include an ethylenically unsaturated polyester of:

i. a liquid glycol selected from a first group consisting of ethylene glycol, diethylene glycol, propylene glycol, dipropylene glycol, butylene glycol, dibutylene glycol, and alkylene glycol having 5-10 carbon atoms, a dialkylene glycol having 10-18 carbon atoms, neopentyl glycol, a polyethylene glycol having an average molecular weight of about 150-700, a polypropylene glycol having an average molecular weight of about 190-2000, a polybutylene glycol having an average molecular weight of about 230-400, and the like;

ii. an acid or acid anhydride selected from a second group consisting of maleic acid, fumaric acid, itaconic acid, citraconic acid, mesaconic acid, maleic anhydride, itaconic anhydride, citraconic anhydride, and the like; and iii. an acid or acid anhydride selected from a third group consisting of phthalic acid, terephthalic acid, isophthalic acid, succinic acid, adipic acid, sebacic acid, azelaic acid, phthalic anhydride, terephthalic anhydride, isophthalic anhydride, succinic anhydride, adipic anhydride, sebacic anhydride, and azelaic anhydride, and the like.

If desired, the third group members can be omitted. However, because of economic considerations they are generally included. For example, the mole ratio of third group member to second group member can be about 1:0.1-10.

The following are typical glycols which can be used to prepare polyester compositions which can be used in our invention; 1,3-butanediol, 1,4-butanediol, 2,3-butanediol, 1,10-decandiol (and the other decanediols), 2,2-diethyl-1,3-propanediol (and the other diethylpropanediols), 1,2-propanediol, 1,3-propanediol, 2-ethyl-1,3-hexanediol (and the other ethylhexanediols), 1,6-hexanediol, 2,5-hexanediol (and the other hexanediols), 2-methyl-2,4-pentanediol, 3-methyl-1-5-pentanediol (and the other pentanediols), the heptanediols, the octanediols, the nonanediols, the decanediols, mixtures of 2 or more such glycols, and the like.

Diglycols and polyglycols which can be used to prepare polyester compositions for use in our invention include; diethylene glycol and polyethylene glycols having molecular weights up to about 700, dipropylene glycols and polypropylene glycols having molecular weights up to about 2000, dibutylene glycols and polybutylene glycols having molecular weights up to about 400, dipentylene glycols and polypentylene glycols having up to about 15 carbon atoms, hexylene glycols and polyhexylene glycols having up to about 18 carbon atoms, diheptylene glycols, dioctylene glycols, dinonylene glycols, mixtures of 2 or more of such diglycols or polyglycols and mixtures of at least one of the diglycols or polyglycols with one or more of the above-mentioned simple glycols.

The term "liquid" as applied to a substance or composition means that the substance or composition is a freely flowing liquid at a temperature of about 40°-50° C.

A solvent for the curable unsaturated polyester resin is included in the polyester resin composition which is used to prepare the improved composition of this invention. The solvent dissolves the polyester and results in the formation of a liquid unsaturated polyester resin solution or composition excellently adapted for use where preparing the composition of this invention.

Such solvents are ethylenically unsaturated monomers including, but are not limited to styrene, methyl acrylate, ethyl acrylate, methyl methacrylate, ethyl methacrylate, trimethylolpropane triacrylate, trimethylolpropane trimethacrylate, pentaerythritol tetraacrylate, triallyl cyanurate, diallyl maleate, divinylbenzene, diallyl phthalate, and the like.

A solvent (or mixture of solvents) for the epoxy resin can be included in the epoxy resins of this invention. Such solvents include, but are not limited to, ketones (e.g., methylethyl ketone), esters of fatty acids (especially liquid esters of fatty acids having 2 or more carbon atoms with alcohols having 2–12 carbon atoms), and aromatic hydrocarbon such as benzene, toluene and the xylenes.

The amount of such solvent used varies with the average molecular weight of epoxy resin or unsaturated polyester. In general such epoxy resin solution or polyester resin solution contains an amount of solvent (or a mixture of two or more solvents) effective for causing the viscosity of the solution to be about 100–1000 centipoises where measured at 25° C with a Brookfield viscometer using a No. 4 spindle rotating at 6 revolutions per minute.

The method used to prepare the ultrafine polypropylene fiber used to prepare our composition is unimportant because any ultrafine polypropylene fiber can be used with excellent results.

Short particles of ultrafine polypropylene fiber formed by milling ultrafine polypropylene fiber in a fluid energy mill are operable for preparing the composition of this invention. However, we generally prefer to use short polypropylene fibers which have been prepared by subjecting a slurry (preferably an aqueous slurry) of ultrafine polypropylene fibers (preferably a mat of ultrafine polypropylene fibers) to the action of a high shear or intense shear mixer. Such mixers, which are sometimes called high (or intense) shear rotary blade mixers, include but are not limited to Waring blenders, Hamilton-Beach blenders Proctor-Silex blenders, Oster blenders (Osterizers), Sears blenders, and the like.

Where using such intense shear mixers to prepare the short particles of ultrafine polypropylene fiber we generally prefer to add the ultrafine polypropylene fibers as a mat or web. For convenience of operation we can cut such mat into pieces having a length of about 2–8 centimeters and a width of about 2–6 centimeters and add the resulting pieces of mat to the liquid component of the slurry. We prefer that such slurry contain about 1–50% of the mat of ultrafine polypropylene fibers.

If desired a surfactant can be included in the slurry. If a surfactant is used we generally prefer to use about 0.01–1% based on the weight of the slurry.

Pages 507–566 of Volume 19 of the Second Edition of the Kirk-Othmer Encyclopedia of Chemical Technology (John Wiley & Sons, Inc. 1969) list a substantial number of surfactants all of which are operable where preparing ultrashort polyethylene fibers in an intense shear mixer for use in the composition of this invention. While all of such surfactants are operable we generally prefer to use nonionic surfactants including those listed on pages 531–554 554 of said Volume 19 of the Kirk-Othmer Encylcopedia.

Especially preferred nonionic surfactants include the Pluronics (including Pluronic L-121) which are nonionic surfactants. They are polyoxyalkylene derivatives of propylene glycol.

After mixing in the high shear mixer for a period of time (e.g., 0.1–30 minutes) effective to cause about 10–99% or more of the ultrafine polypropylene fibers to have a length of 1–100 microns (i.e., to become short) the slurry is removed from the mixer, the fibers are separated from the liquid (e.g., by filtration or centrifugation), washed (if desired), dried at about 50°–85° C (preferably at about 60°–80° C and preferably under reduced pressure), and recovered. The recovered fibers are ready to use in the preparation of the thixotropic curable ethylenically unsaturated polyester composition of this invention.

We admix a liquid epoxy resin composition or a liquid ethylenically unsaturated polyester resin composition generally having a viscosity of about 100–1000 centipoises at 25° C (where measured with a Brookfield viscometer having a No. 4 spindle revolving at 6 revolutions per minute) and an amount (generally 0.1–10% (or 0.2–5%) based on the weight of the polyester resin composition before adding the short ultrafine polypropylene fibers) of short ultrafine polypropylene fibers effective to cause the resulting epoxy resin or polyester resin composition to have a viscosity of about 1000–25,000 centipoises where measured at 25° C with a Brookfield viscosimeter using a No. 4 spindle rotating at 6 revolutions per minute and a viscosity of about 500–10,000 centipoises at 25° C where the viscosity is measured with a Brookfield viscometer using a No. 4 spindle rotating at 60 revolutions per minute.

If desired very fine silica particles (e.g., particles having a particle size of about 0.01–10 microns) can be included with the short ultrafine polypropylene fibers which are admixed with the polyester resin composition to form the composition of this invention. The quantity of such silica used is generally about 5–400% (or 10–3000%) of the weight of the short ultrafine polypropylene fibers used. Alternatively the silica can be admixed with the polyester resin composition before or after adding the polypropylene fibers.

If desired, the silica can be admixed with the ultrafine polypropylene fibers before shortening them by passing them through a fluid energy mill or before treating the fibers in a high shear mixer to convert them to short fibers.

Various methods for admixing short ultrafine polypropylene fibers with a polyester resin composition will, because of our disclosure, be readily apparent to those skilled in the art. However, we prefer to agitate the polyester resin composition in a mixing zone (e.g., a drum or tank) and add the short ultrafine polypropylene fibers thereto while continuing the agitation. Agitation is continued until fibers are dispersed substantially evenly throughout the resulting admixture. We generally prefer to use a variable speed motor-driven impeller extending into the liquid polyester resin to produce the agitation.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLE I

A mat of ultrafine polypropylene fibers weighing 10 grams and 250 milliters of water was placed in a hgih shear rotary blade mixer (an Osterizer). The mixer were run for 5 minutes at its highest setting. The resulting suspension was removed from the mixer and the fibers were separated from the water by filtration. The separated fibers were dried for about 16 hours at 60° C under vacuum (an absolute pressure of about 2–3 centimeters of mercury). The dried ultrafine polypropylene fibers which were designated "Fibers No. 1" had a length of about 1–30 microns and a thickness (diameter) of about 0.1–2 microns.

A 1.5 gram portion of the above prepared dried ultrafine fibers (Fibers No. 1) was added to a 150 g portion of a commercially available polyester resin composition (Marco GR-94) general purpose polyester resin) which had been diluted with additional styrene (5 parts of styrene per 95 parts of the polyester resin composition) to form a resin designated "Polyester No. 1".

Fibers No. 1 and Polyester No. 1 were admixed by stirring with a propeller (impeller) attached to a shaft which was driven (rotated) by an electric motor. The resulting blend of Fibers No. 1 in Polyester No. 1 was designated "Thickened Polyester No. 1".

The viscosity of Thickened Polyester No. 1 was determined at 25° C with a Brookfield viscometer using a No. 4 spindle rotating at 6 revolutions per minute and at 60 revolutions per minute. The viscosities were 2200 centipoises at 6 revolutions per minute and 905 centipoises at 60 revolutions per minute. This represents a thixotropic index of 2200/905 = 2.4.

The corresponding viscosities for Polyester No. 1 were 400 centipoises at 6 revolutions per minute and 300 centipoises at 60 revolutions per minute.

EXAMPLE II

Four additional runs were made using the general procedure of Example I except that the mixing times in the Osterizer and the ratios of water to ultrafine polypropylene fibers were as shown in Table I. The viscosities and thixotropic indexes of the resulting mixtures of Polyester No. 1 and Fibers No. I are also shown in said table.

TABLE I

| RUN NO. | Mixing Time In Osterizer, Minutes | Ratio of Water to Ultrafine Polypropylene Fibers in Osterizer | Viscosity at 25° C, Centipoises | | Thixotropic Index |
|---|---|---|---|---|---|
| | | | at 6RPM* | at 60 RPM** | |
| 1 | 5 | 50:1 | 2,680 | 1,040 | 2.6 |
| 2 | 10 | 50:1 | 2,120 | 895 | 2.4 |
| 3 | 20 | 50:1 | 1,400 | 730 | 1.9 |
| 4 | 2 | 50:1 | 3,060 | 1,140 | 2.7 |

*Viscosity at 25° C using a Brookfield viscometer with a No. 4 spindle rotating at 6 revolutions per minute.
**Viscosity at 25° C using a Brookfield viscometer with a No. 4 spindle rotating at 60 revolutions per minute.

EXAMPLE III

Two additional runs were made using the general procedure of Example I. However, in these runs the high shear mixer was a Waring Blender and Run No. 2 of this example (Example III) differed from Run No. 1 of said Example III in that 4 parts of a surfactant (Pluronic L-121, a nonionic surfactant which is a polyoxyalkylene derivative of polypropylene glycol) per 100 parts of ultrafine polypropylene fibers was included in the water admixed with the ultrafine polypropylene fibers in the Waring Blender.

In both runs of this example 0.25 parts of the short ultrafine polypropylene fibers was admixed with polyester resin-styrene mixture (the Polyester No. 1 described in Example I, supra).

The viscosities and thixotropic indexes of the resulting compositions are reported in Table II.

TABLE II

| RUN NO. | Viscosity at 25° C, Centipoises | | Thixotropic Index |
|---|---|---|---|
| | at 6 RPM | at 60 RPM | |
| 1 | 3,600 | 1,860 | 1.9 |
| 2 | 2,800 | 1,270 | 2.2 |

EXAMPLE IV

The general procedure of Run No. 2 of Example III, supra was repeated. However, in this instance the procedure was modified by using a fluid energy mill (rather than the high shear mixer) to convert the ultrafine polypropylene fibers into short ultrafine polypropylene fibers.

An admixture of 100 parts of ultrafine polypropylene fibers, 300 parts of commerically available silica, and 4 parts of the above-mentioned surfactant (Pluronic L-121) was milled in a fluid energy mill to reduce the size of the silica particles, to convert the ultrafine polypropylene fibers to short ultrafine polypropylene fibers, and to thoroughly admix the silica particles, the short ultrafine polypropylene fibers, and the surfactant. A portion of the resulting mixture was admixed with a portion of the above-described Polyester No. 1 using 2 parts of said mixture per 100 parts of polyester No. 1 (See Example 1 for a description of Polyester No. 1).

The viscosity of the polyester after adding the above-described admixture of short ultrafine polypropylene fibers, silica, and surfactant therewith (2 parts of said admixture per 100 parts of Polyester No. 1) was 3,000 centipoises where using a Brookfield viscometer with a number 4 spindle rotating at 6 revolutions and 1,100 centipoises where said spindle was rotating 60 revolutions per minute. The results correspond to a thixotropic index of 2.7.

As used herein the term "percent (%)" means parts per hundred and the term "parts" means parts by weight.

As used herein the term "ultrafine" as applied to polypropylene fiber means that 90–95% of said fibers have a diameter of 2 microns or less and that substantially none of said fibers have a diameter greater than 5 microns.

As used herein the term "short" as applied to ultrafine polypropylene fibers means that 90–95% of said fibers have a length of 100 microns or less and that substantially none of said fibers have a length greater than 500 microns.

As applied to a polyester resin composition or to an epoxy resin the term "liquid" means that the resin is free flowing liquid at a temperature of about 40°–50° C.

We claim:

1. In a liquid ethylenically unsaturated polyester resin composition comprising a curable ethylenically unsaturated polyester resin composition comprising a polyester resin of a polyhydric alcohol and an ethylenically unsaturated polycarboxylic acid admixed with styrene, the improvemet comprising the presence in the composition of an amount of short ultrafine polypropylene fibers effective for causing the composition to have a thixotropic index of 1.5-8 over a 10 fold change in the rate of spindle rotation, the viscosity being determined with a Brookfield viscometer using a number 4 spindle, the spindle rotating 6 and 60 times per minute respectively.

2. In a liquid ethylenically unsaturated polyester resin composition comprising a polyester resin of a polyhydric alcohol and an ethylenically unsaturated polycarboxylic acid admixed with styrene, the improvement comprising the presence in the composition of an amount of ultrafine polypropylene fibers effective for causing the composition to have a thixotropic index of 1.5-8 over a 10 fold change in the rate of spindle rotation, the viscosity being determined with a Brookfield viscometer using a number 4 spindle, the spindle rotating 6 and 60 times per minute respectively, the polypropylene fibers being short ultrafine polypropylene fibers having a length of about 1-100 microns and a diameter of about 0.05-2 microns, said short fibers being prepared by agitating a slurry of ultrafine polypropylene fibers in a high-shear rotary blade mixer for a time effective to reduce the length of the ultrafine polypropylene fibers to about 1-100 microns, separating, drying, and recovering the resulting short ultrafine polypropylene fibers.

* * * * *

UNITED STATES PATENT AND TRADEMARK OFFICE
CERTIFICATE OF CORRECTION

PATENT NO. : 4,008,294
DATED : 15 February 1977
INVENTOR(S) : Marans, Ferington, and Messina It is certified that error appears in the above–identified patent and that said Letters Patent are hereby corrected as shown below:

In column 9, line 10, change "improvemet" to --improvement--

In column 10, line 18, change "polypropvlene" to --polypropylene--

Signed and Sealed this

Seventeenth Day of May 1977

[SEAL]

Attest:

RUTH C. MASON
Attesting Officer

C. MARSHALL DANN
Commissioner of Patents and Trademarks